US005543697A

United States Patent [19]

Carobolante et al.

[11] Patent Number: 5,543,697
[45] Date of Patent: Aug. 6, 1996

[54] CIRCUIT AND METHOD FOR CONTROLLING THE SPEED OF A MOTOR

[75] Inventors: Francesco Carobolante, Portola Valley; Curtis Robinson, Sunnyvale, both of Calif.

[73] Assignee: SGS-Thomson Microelectronics, Inc., Carrollton, Tex.

[21] Appl. No.: 330,316

[22] Filed: Oct. 27, 1994

[51] Int. Cl.[6] .................................................. G05B 11/18
[52] U.S. Cl. ........................... 318/594; 318/595; 318/608; 318/603
[58] Field of Search ..................... 318/560–696, 318/254, 439, 138; 369/44.28, 32, 33, 44.27, 44.25, 44.32; 360/78.06, 68, 51, 78.01; 388/842; 73/862.61

[56] References Cited

U.S. PATENT DOCUMENTS

| | | | |
|---|---|---|---|
| 3,686,547 | 8/1972 | Kelling | 318/594 |
| 4,429,267 | 1/1984 | Veale | 318/594 |
| 4,972,186 | 11/1990 | Morris | 318/605 |
| 4,988,936 | 1/1991 | Schneider | 318/632 |
| 5,017,845 | 5/1991 | Carobolante et al. | 318/138 |
| 5,136,226 | 8/1992 | Schneider | 318/632 |
| 5,172,036 | 12/1992 | Cameron et al. | 318/138 |
| 5,191,269 | 3/1993 | Carobolante | 318/254 |
| 5,199,017 | 3/1993 | Kagami et al. | 369/44.28 |
| 5,204,594 | 4/1993 | Carobolante | 318/254 |
| 5,221,881 | 6/1993 | Cameron | 318/254 |
| 5,223,772 | 6/1993 | Carobolante | 318/254 |
| 5,255,253 | 10/1993 | Kagami et al. | 369/44.28 |
| 5,258,695 | 11/1993 | Utenick et al. | 318/138 |
| 5,285,135 | 2/1994 | Carobolante et al. | 318/254 |
| 5,293,445 | 3/1994 | Carobolante | 388/813 |
| 5,296,857 | 3/1994 | Carobolante | 341/144 |
| 5,313,440 | 5/1994 | Fuldner et al. | 369/32 |
| 5,329,560 | 7/1994 | Rastegar et al. | 375/120 |
| 5,339,299 | 8/1994 | Kagami et al. | 369/32 |
| 5,343,127 | 8/1994 | Maiocchi | 318/254 |
| 5,384,762 | 1/1995 | Kagami et al. | 369/44.28 |
| 5,397,972 | 3/1995 | Maiocchi | 318/439 |
| 5,402,402 | 3/1995 | Kagami et al. | 369/44.28 |
| 5,419,204 | 5/1995 | Yamaguchi et al. | 73/862.61 |
| 5,426,625 | 6/1995 | Bui et al. | 369/44.32 |

OTHER PUBLICATIONS

S. Cameron and F. Carobolante: "Speed Control Techniques for Hard Disc Drive Spindle Motor Drivers." Jun., 1993.
"3–Phase Brushless DC Motor Controller/Driver with Back-–EMF Sensing," Allegro 8902 Datasheet, May 28, 1992.

Primary Examiner—Paul Ip
Attorney, Agent, or Firm—Joseph C. Arrambide; Lisa K. Jorgenson

[57] ABSTRACT

A method and circuit for implementing a frequency lock loop circuit in a disk drive is disclosed. The circuit includes the motor control elements of a direct current motor plus a coarse counter, a fine counter, and a digital to analog converter. The coarse counter is used to count down from a programmed coarse count. The fine counter begins to count down from a fine count when the coarse counter reaches zero. The count in the fine counter, when a zero crossing occurs, represents the difference between the expected period and the actual period and is loaded into a digital to analog converter which converts the difference to an analog voltage which is used by the coil drive circuit to either speed up or slow down the motor. The digital to analog conversion may be realized by a charge pump circuit.

19 Claims, 4 Drawing Sheets

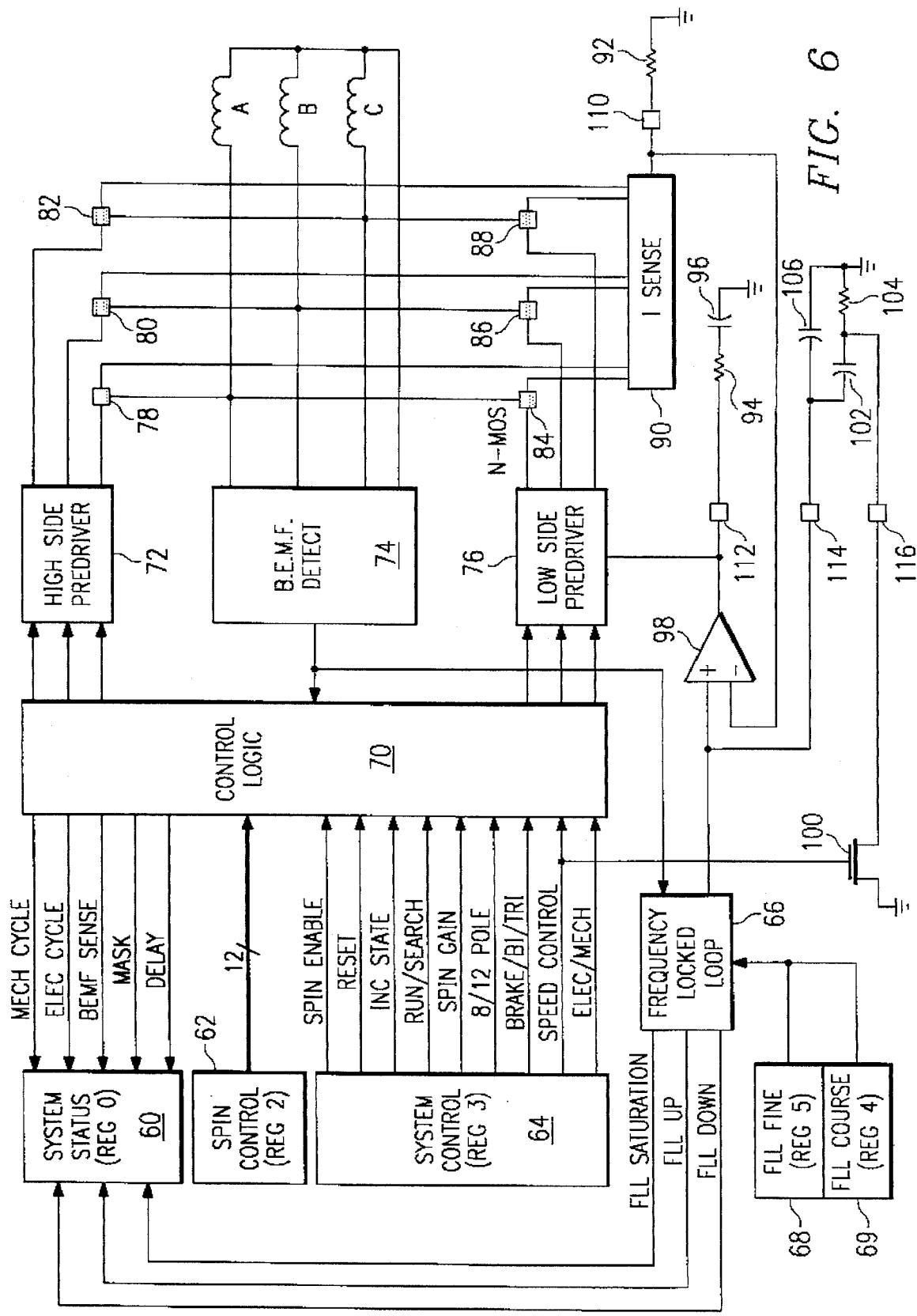

CIRCUIT AND METHOD FOR CONTROLLING THE SPEED OF A MOTOR

BACKGROUND OF THE INVENTION

1. Field of the Invention

This invention relates to electronic circuits used to control the speed of a direct current motor and more particularly to a method and circuit for using a frequency lock loop to control the speed of a motor, and still more particularly to a method and circuit for using a coarse counter and a fine counter in a frequency control loop.

2. Description of the Relevant Art

The problem addressed by this invention is encountered in the disk drive industry where the accuracy of rotational speed is increasingly important. The trend in the industry has been to increase the storage capacity and the accuracy of the disk drive while reducing the weight and power consumption. Consequently, drive manufacturers have increased the density of data on a disk in a disk drive while decreasing the inertial and rotational mass of the disk drive; therefore, the need for controlling the speed of a drive to a high degree of accuracy while minimizing jitter is becoming of paramount importance, especially in high density small package disk drives such as those used in the portable computer market.

FIG. 1 shows a block diagram of a speed control circuit as is known in the prior art. The speed control circuit consists of a sequencer 10, a back EMF detection circuit 12, a serial port 14, a spindle block 16, a frequency lock loop circuit 18, an oscillator 20, and stator coils A, B, and C. It is well known in the art a disk drive is manufactured by combining the block diagram of the speed control circuit in FIG. 1 with read/write heads, head motors, magnetic media, a rotor, and a disk drive housing. The rotor, which is not shown in the diagram, rotates responsive to coils A, B, and C being energized in a standard sequence, such as in bipolar operation. In bipolar operation, sequencer 10 controls spindle block 10 such that current is driven through two coils while a third coil is left floating. The sequencer 10 controls the spindle block 16 such that back electromotive force (BEMF) of the floating coil is buffered so that the BEMF detection circuit 12 can generate a zero crossing signal from the buffered BEMF signal. The zero crossing signal is used by the sequencer to determine the position of the rotor relative to the stator coils and is used by the frequency lock loop circuit 18 to control the rotational velocity of the rotor. The method and apparatus for operating a polyphase DC motor is more fully explained in U.S. Pat. No. 5,221,881, which is fully incorporated into this specification by reference.

In general, the rotational velocity is controlled the frequency lock loop by comparing the actual period for rotation to the period of a reference signal and, from this comparison, determining whether the rotor is going too fast or too slow. Oscillator circuit 20 and a counter in the frequency lock loop 18 provide the reference period for the comparison. Serial port 14 is used to communicate the desired speed to the frequency lock loop, as is known in the art. If the rotor is going too fast, the frequency lock loop circuit 18 provides a signal to the spindle block which lowers the current to the coils to slow them down. Conversely, if the rotor is going too slow, the frequency lock loop circuit provides a signal to the spindle block 16 which increases the current to the coils. The method and apparatus for controlling the speed in a direct current motor is more fully explained in U.S. Pat. No. 5,223,772, which is fully incorporated into this specification by reference.

FIG. 2 shows the frequency lock loop circuit 18 in detail. In FIG. 2, the zero crossing signal enters the programmable divider 22 and is divided by the number of poles in the motor, which is programmable through the serial port connection. By dividing the zero crossing signal by the number of poles in the motor, a tach signal is developed that changes state every mechanical revolution. This is done to develop a low jitter tach signal.

The 14 bit programmable counter 24 is used to generate the reference period which is compared to the tach signal. More specifically, the serial port programs the 14 bit programmable counter with a count which, when multiplied by the frequency of the oscillator, represents the reference period for one revolution. When the tach signal is received by the 14 bit programmable counter 24, it begins to count down from the programmed count and sets the reference signal on line 25 high. When the count has reached zero, the reference signal 25 goes low.

The tach signal on line 23 and the reference signal on line 25 are used to control current sources 26 and 28, respectively. Current source 26, when on, charges the compensation network 33, which consists of capacitor 30, capacitor 32, and resistor 34. Conversely, current source 28 discharges the compensation network 33. The current source 26 and 28 in combination with the control signals are commonly referred to as a charge pump circuit since the current source charge or discharge the compensation network, as described above. The resulting voltage on the compensation network is buffered by amplifier 36 and then received by the spindle block 16 of FIG. 1. The spindle block 16 uses the buffered signal to control the current used to drive the stator coils, which ultimately controls the speed of the motor.

FIG. 3 shows the relationship of the tach signal to the reference signal. The top wave form shows the tach signal for a motor that is running slow. For a motor running slow, the period of the tach signal would be longer than the reference signal by an amount equal to the time indicated by the arrows on the tach (slow) wave form in FIG. 3. In this case, the charge pump 27 and more specifically the current source 26 would charge network 33 to a higher voltage, which could be sensed by amplifier 36 to speed the motor. Conversely, the second wave form tach (fast) shows a tach signal where the motor is running faster than the reference signal by the amount indicated by the arrows labeled fast. In this case, the charge pump 27 and more specifically current source 28 would discharge the compensation network 33. In both cases, the difference between the tach signal and the reference signal represents the error in the speed control circuit.

A problem with the prior art circuit is that the frequency lock circuit can only measure every other cycle. Consequently, the bandwidth of the FLL is limited. A second problem is that the frequency lock loop circuit does not perform well on hard disk drives in portable computers since a portable system exposed to physical shocks. Small movements of the system can create temporary fluctuations in the rotational velocity which can cause the FLL to respond to the change by changing the power to the motor. Since the fluctuations in the rotational velocity are temporary, the resulting corrections by the FLL are typically over reactions to the physical shock. The problem is that the speed control loop tries to compensate for these fluctuations which would otherwise just die out because of the counter action in the physical shock.

Therefore, it is an object of the invention to create a high precision speed control loop.

It is further an object of this invention to increase the bandwidth of a frequency lock loop.

It is further an object of the invention to have the response of a FLL be programmable so that the response can be optimized for a given application.

It is further an object of the invention to have a FLL which is programmable at each electrical cycle or phase.

These objects and others will become apparent to those skilled in the art having access to the following specification and drawings.

BRIEF DESCRIPTION OF THE DRAWINGS

FIG. 6 is a block diagram of a motor control circuit which includes a frequency lock loop circuit of the invention.

DETAILED DESCRIPTION OF THE PREFERRED EMBODIMENT

Figure 1:
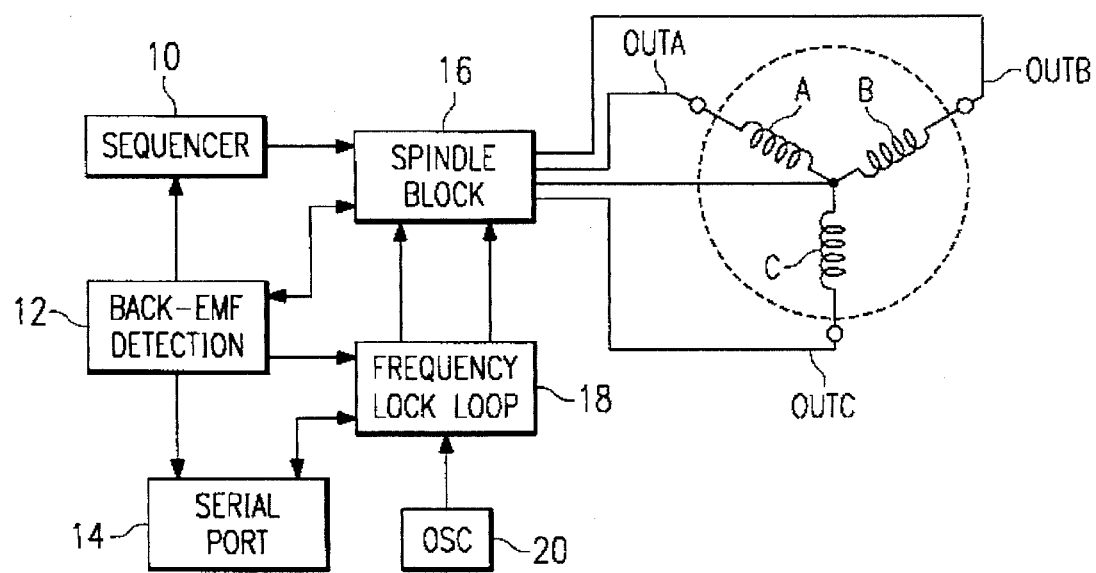
FIG. 1 is a block diagram of a motor control circuit as known in the prior art.
Figure 2:
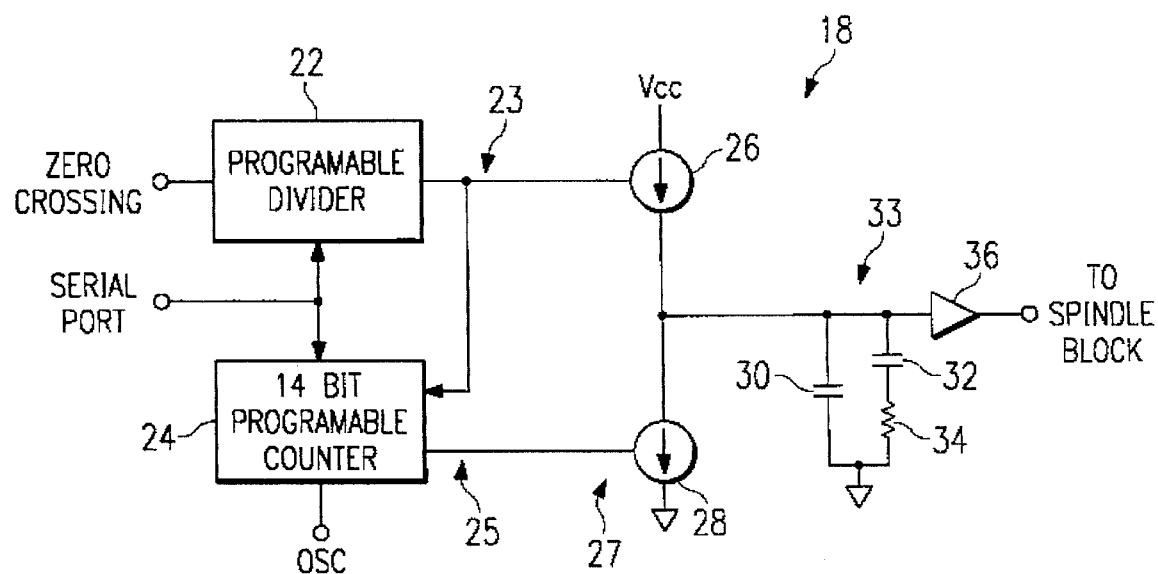
FIG. 2 is a schematic drawing of a frequency lock loop circuit as known in the prior art.
Figure 3:
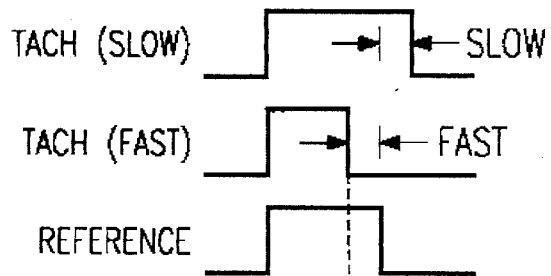
FIG. 3 is a timing diagram of a frequency lock loop as known in the prior art.
Figure 4:
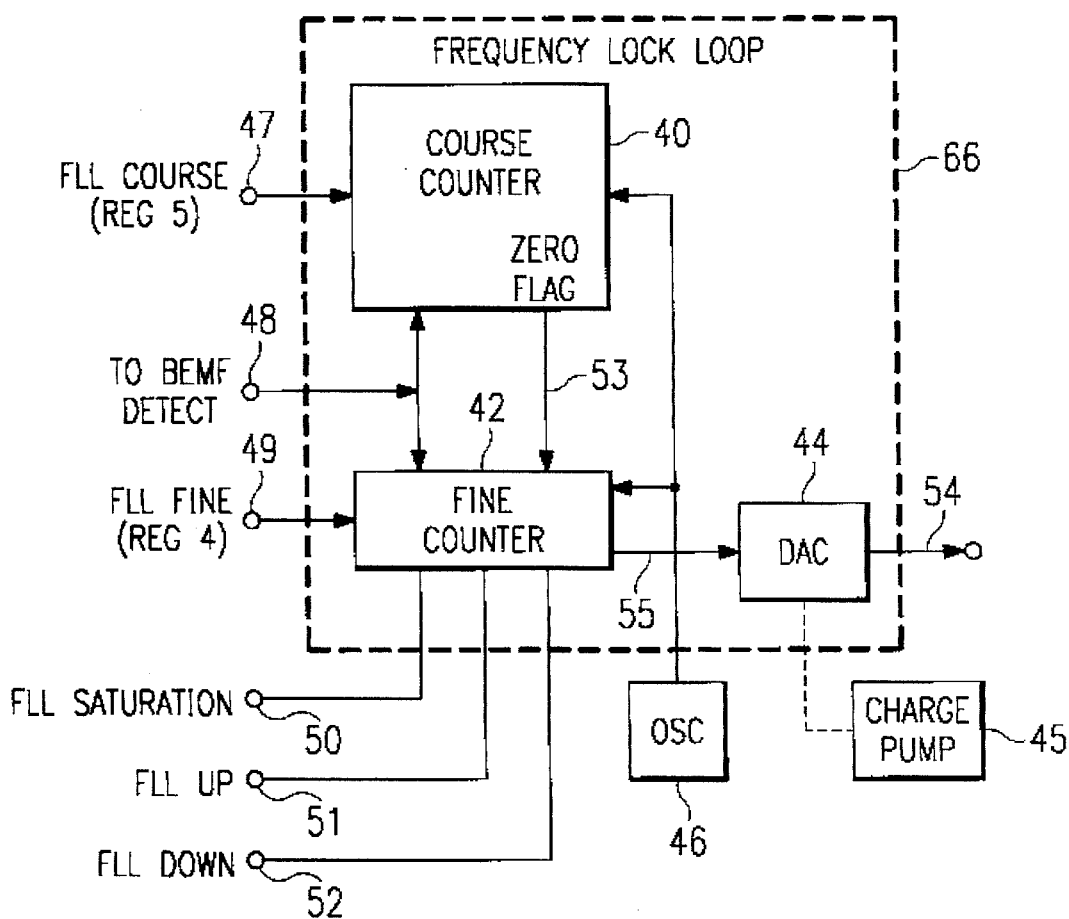
FIG. 4 is a schematic diagram of frequency lock loop circuit in an embodiment of the invention.

FIG. 4 illustrates a frequency lock loop circuit 66 according to the preferred embodiment of the present invention. In FIG. 4, the frequency lock loop circuit includes a coarse counter 40, a fine counter 42, and a digital to analog converter (DAC) 44. In this embodiment, the digital to analog converter is often implemented with a charge pump 45 as illustrated in FIG. 2 of the prior art. The coarse counter is connected to line 47 which provides the FLL coarse count from register 5 (as shown in FIG. 6). The coarse counter 40 and the fine counter 42 each receive a zero crossing signal on line 48. A zero flag output of the coarse counter 40 is connected by line 53 to a start input of the fine counter 42. The oscillator 46 is connected to the coarse counter 40 and the fine counter 42. Oscillator 46 can be any reference frequency source such as a system clock signal or a divided system clock signal and the like. The fine counter 42 is connected to line 49 which provides the FLL fine count from register 4. The fine counter 42 is also connected to line 50, 51, and 52 and to the input of DAC 44. The output of DAC 44 is connected to line 54.

In operation, the FLL coarse count is loaded from line 47 into the coarse counter 40. Similarly, the FLL fine count is loaded from line 49 into the fine counter 42. When a zero crossing is detected on line 48 by the coarse counter 40, the coarse counter begins to count down from the FLL coarse count. When the coarse counter has reached zero, the zero flag changes states which causes fine counter 42 to begin counting down from the FLL fine count. When a zero crossing is next detected, the count to which the fine counter has counted (hereinafter the error count) is loaded through line 55 into the DAC 44. Consequently, the output of DAC 44 is a signal proportional to the count in the fine counter 42 when actual zero crossing occurs, the error count.

Figure 5:
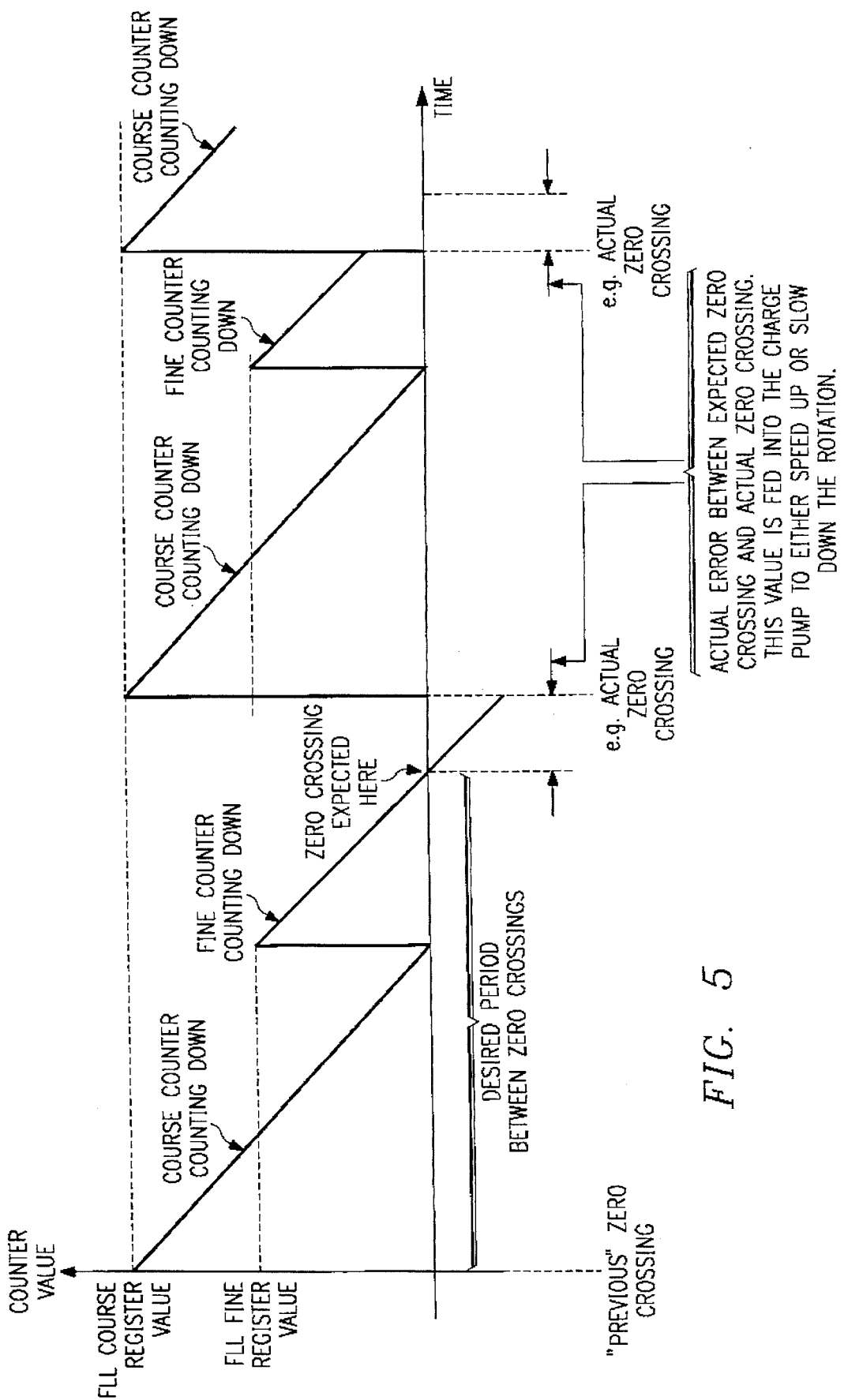
FIG. 5 is timing diagram of the frequency lock loop circuit in an embodiment of the invention.

If a charge pump 45 is used, the charge pump 45 begins to charge the compensation network when the fine counter reaches zero and stops charging when the actual zero crossing occurs. This is illustrated in FIG. 5 as the time where the fine counter is counting past zero. Conversely, the charge pump 45 begins to discharge the compensation network when a zero crossing occurs before the fine counter has reached zero. In this case, the charge pump 45 ceases to discharge the compensation network when the fine counter reaches zero. Consequently, the actual error between expected zero crossing and actual zero crossing is feed into the charge pump to either charge up or charge down the compensation network which ultimately will speed up or slow down the rotation of the motor.

FIG. 5 illustrates the coarse counter counting down from the FLL coarse count, the fine counter counting down from the FLL fine count starting from when the coarse counter counted down to zero, and the actual zero crossing. The sequence can be summarized as:

1. Initially loading a coarse counter with a FLL coarse count and loading a fine counter with a FLL fine count.
2. Detecting a zero crossing.
3. In response to detecting a zero crossing, a coarse counter counting down from the FLL coarse count.
4. In response to the coarse counter counting to zero, a fine counter counting down from a FLL fine count.
5. In response to a second zero crossing, loading the count of the fine counter at the time of the zero crossing into the input of a DAC.
6. Repeating steps 2–5.

If a charge pump is used, step 5 is replaced with:

5. If the fine counter counts to zero before a zero crossing occurs, than a charge pump charging a compensation network until the zero crossing occurs. If a zero crossing occurs before the fine counter occurs, then the charge pump discharges a compensation network until the fine counter counts to zero.

Although the method is described using a DAC or a charge pump, it is understood that the present disclosure has been made only by way of example, and that numerous changes in the combination and arrangements of parts can be resorted to by those skilled in the art without departing from the spirit and scope of the invention.

As FIG. 5 shows, the coarse counter can begin to count down in a subsequent cycle at the same zero crossing causing the fine counter contents to be output in the prior cycle. Consequently, the disclosed invention is advantageous over the prior art in that the error count is obtained on every revolution instead of every other revolution as in the prior art. This increases the bandwidth of the response loop and therefore is more responsive to changes in rotational velocity. Additionally, the sensitivity of the loop can be controlled by programming in combinations of FLL coarse and fine counts. For example, a larger FLL coarse count and smaller FLL fine count would provide a smaller range of response for the DAC than would a smaller FLL coarse counter and a larger FLL fine count. A less sensitive range of responses may be desirable in a portable environment where physical movement can temporarily effect the rotational velocity and is self correcting. Since the effect is self correcting, a large response may be an overreaction by the FLL. Consequently, it is an advantage to persons skilled in the art to be able to program the sensitivity of the loop response to match and optimize the sensitivity to the application.

In the preferred embodiment, a different course and/or fine count can be loaded into the count registers at the beginning of every electrical cycle instead of every mechanical revolution. In the prior art, every zero crossing is typically divided by the number of zero crossings (electrical cycles) per revolution to compensate for imperfections in the construction in the rotor. These imperfections cause differences in the expected period between electrical cycles since the rotational distance between phases is often not perfectly symmetrical. If a expected period was used for each electrical cycle, the expected period would not correspond to the actual period even if the rotational velocity was accurate because of the mechanical imperfections. This would cause jitter since the FLL would be speeding up and slowing down the motor in response to the mechanical imperfections. The possibility of loading a different count in the registers every electrical cycle allows for correctly loading an expected period which matches the particular mechanical imperfections of a given cycle. This technique is advantageous over the prior art since it increases the bandwidth of the FLL while decreasing jitter.

Although FIG. 4 and FIG. 5 illustrate the invention using a course counter which counts down and a fine counter which also counts down, it is understood in the art that either counter can be designed to count up. It is understood that the present disclosure has been made only byway of example, and that numerous changes in the combination and arrangements of parts can be resorted to by those skilled in the art without departing from the spirit and scope of the invention.

FIG. 6 illustrates a block diagram of a motor control circuit which includes the frequency lock loop circuit 66 of FIG. 4. In FIG. 6, control logic 70 is connected to a high side predriver 72 and to a low side predriver 76. Control logic 70 is also connected to a system status 60, a spin control 62, and a system control 64. High side predriver 72 is connected to the control elements of driver transistor 78, driver transistor 80, and driver transistor 82. Low side predriver 76 is connected to the control elements of driver transistor 84, driver transistor 86, and driver transistor 88. One end of stator winding A is connected to the center tap and the other end is connected to transistor 78, to the BEMF detect block 74, and to transistor 84. Stator winding B is connected at one end to the center tap and the other end is connected to driver transistor 80, to BEMF detect 74, and to transistor 86. Stator winding C is connected at one end to center tap and at the other end to transistor 82, to BEMF detect 74, and to transistor 88. The output of BEMF detect 74 is connected to control logic 70 and to frequency locked loop 66. Transistors 78, 80, 82, 84, 86, and 88 are connected to I sense 90. Frequency locked loop 66 is connected to FLL fine 68 and to FLL coarse 69. Frequency locked loop 66 is also connected to system status 60 and to the non-inverting input of amplifier 98. The inverting input to amplifier 98 is connected to I-sense 90 and output pin 110. The output of amplifier 98 is connected to output pin 112 and low side predriver 76. Transistor 100 has a gate connected to system control 64, a source connected to ground, and a drain connected to external pin 116. External pin 110 is connected to an external resistor 92 which is connected to ground. External pin 112 is connected to an external resistor 94 which is in series with an external capacitor 96 which is connected to ground. External pin 114 is connected to the first side of capacitor 102 and the first side of capacitor 106. External pin 116 is connected to the second side of capacitor 102 and to external resistor 104 which is connected to ground. The second side of capacitor 106 is connected to ground.

In operation, control logic 70 sequences current in coils A, B, and C by controlling the high side predriver 72 and the low side predriver 76, thereby controlling transistors 78, 80, 82, 84, 86, and 88. Spin control 62 and system control 64 provide conventional information to control logic 70 such as spin enable, reset, increment state, run search, spin gain, 812 pole, brake/by/tri, speed control, and elec/mech data. Logic control 70 uses this information for determining the appropriate commutation sequence.

As the rotor (not shown in FIG. 6) rotates, the BEMF in the floating coil is detected by BEMF detect 74 which generates a zero crossing signal. The zero crossing signal can be divided down by the number of commutation phases in a rotation so that the zero crossing signal represents a complete revolution or it can be left undivided to represent the period for each commutation phase. The zero crossing signal is sent to control logic 70 and to frequency locked loop 66. The zero crossing signal from BEMF detect 74 is compared to the expected zero crossing in frequency locked loop 66, as described above. The error between the zero crossing signal and the expected zero crossing is converted into an analog voltage in the frequency lock loop 66 which drives the non-inverted input of amplifier 98. External resistor 104, external capacitors 102 and 106, provide external compensation for the circuit. The voltage at external pin 110 is proportional to the current through the coils and provides negative feedback to amplifier 98.

As discussed earlier, the disclosed invention is advantageous over the prior art in that the error count is obtained on every revolution instead of every other revolution as in the prior art. This increases the bandwidth of the response loop and therefore is more responsive to changes in rotational velocity. Also, the possibility of loading a different count in the registers every electrical cycle allows for correctly loading an expected period which matches the particular mechanical imperfections of a given cycle. This technique is advantageous over the prior art since it increases the bandwidth of the FLL while decreasing jitter. Additionally, the sensitivity of the loop can be controlled by programming in combinations of FLL coarse count and FLL fine count. For example, a larger FLL coarse count and smaller FLL fine count would provide a smaller range of response for the DAC than a smaller FLL coarse counter and a larger FLL fine count. A less sensitive range of responses may be desirable in a portable environment where physical movement can temporarily effect the rotational velocity and is self correcting. Since the effect is self correcting, a large response may be an overreaction by the FLL. Consequently, it is an advantage to persons skilled in the art to be able to program the sensitivity of the loop response to match and optimize the sensitivity to the application.

Although the invention has been described and illustrated with a certain degree of particularity, it is understood that the present disclosure has been made only by way of example, and that numerous changes in the combination and arrangements of parts can be resorted to by those skilled in the art without departing from the spirit and scope of the invention, as herein claimed.

We claim:

1.

a) loading a coarse counter with a course count;

b) loading a fine counter with a fine count;

c) counting down the course counter starting when a position indicator signal is detected;

d) counting down with the fine counter starting when the course counter has counted down to zero;

e) driving a coil of a motor with a current proportional to a count of the fine counter when the position indicator signal is detected;

f) repeating steps a–e to maintain the speed of the motor.

2. The method of claim 1 further comprising loading the coarse counter with a FLL coarse count.

3. The method of claim 1 further comprising loading the fine counter with a FLL fine count.

4. The method of claim 1 wherein the detecting a position indicator signal comprises detecting the zero crossing of the back electromotive force of a floating coil.

5. The method of claim 4 wherein the detecting a position indicator signal further comprises dividing the number of zero crossings detected by the number of phases per rotation so that a tach signal is detected upon every rotation.

6. The method of claim 1 wherein the step of driving the coil of a motor with a current proportional to the count of said fine counter further comprises the steps of loading a digital to analog converter with the count in the fine counter when a rotation indicator signal is detected and driving the spindle block stage of a motor with a compensated output of a digital to analog converter.

7. The method of claim 1 wherein the step of driving the coil of a motor with a compensated current proportional to the count of said fine counter further comprises the steps of:

if the fine counter counts to zero before a zero crossing occurs, than a charge pump charging a compensation network until the zero crossing occurs, if a zero crossing occurs before the fine counter counts to zero, then the charge pump discharging the compensation network until the fine counter counts to zero, and driving the spindle block stage of a motor with the compensated output proportional a voltage on the compensation network.

8. The method of claim 1 wherein said fine counter comprises a 12 bit counter.

9. The circuit of claim 1 wherein said fine counter comprises a 12 bit counter.

10. A circuit for controlling the speed of a direct current motor having a rotor and a plurality of stator coils, said circuit comprising:

a zero crossing detector having an output;

a frequency comparison circuit comprising;

a coarse counter coupled to the output of said zero crossing detector, having a coarse count input, and having a zero count output, a fine counter having a fine count input for loading a fine count, having a zero crossing input connected to the output of said zero crossing detector, having a start count input connected to the zero count output of said coarse counter so that the fine counter begins to count down from the fine count when said coarse counter has counted down to zero, and having an error signal output for outputing an error count when the zero crossing is detected;

a digital to analog converter having an input connected to the error signal output of said fine counter for converting the error count into an error voltage, and having an analog output; and a spindle block circuit having an input connected to the analog output of said digital to analog converter and having an output connected to the stator coils of said motor, for driving said stator coils with a current proportional to said error voltage.

11. The circuit of claim 10 where said digital to analog converter comprises a charge pump circuit.

12. The circuit of claim 10 wherein said zero crossing detector further comprises a divider circuit for reducing the zero crossings detected by a multiple of the electrical cycles in a mechanical revolution.

13. The circuit of claim 12 wherein said divider circuit divides the zero crossings by the number of zero crossings in one mechanical revolution.

14. The circuit of claim 10 wherein said fine counter further comprises a frequency lock loop saturation output.

15. A disk drive system comprising read/write heads, a head motor for moving the heads, media for storing data, a media motor for rotating the media, a circuit for controlling the speed of the media motor, and a housing to support the heads, head motor, media, and media motor, wherein said circuit for controlling the speed of the media motor further comprises:

a zero crossing detector having an output;

a frequency comparison circuit comprising;

a coarse counter having a zero crossing input connected to the output of said zero crossing detector, having a register input for loading a first count from the register, and having a zero count output, said coarse counter counting down from the first count when said zero crossing detector indicates a beginning of a cycle; and a fine counter having a register input for loading a second count, having a zero crossing input connected to the output of said zero crossing detector, having an start count input connected to the zero count output of said coarse counter so that the fine counter begins to count down from the second count when said coarse counter has counted down to zero, and having an error count output for outputing the error count when a zero crossing is detected;

a digital to analog converter having an input connected to the error count output of said fine counter for converting the error count into an error voltage, and having an analog output; and a spindle block circuit having an input connected to the analog output of said digital to analog converter and having an output connected to the stator coils of said motor, for driving said stator coils with a current proportional to said error voltage.

16. The disk drive system of claim 15 where said digital to analog converter comprises a charge pump circuit.

17. The disk drive system of claim 15 wherein said fine counter comprises a 12 bit counter.

18. The circuit of claim 15 wherein said zero crossing detector further comprises a divider circuit for reducing the zero crossings detected by a multiple of commutation phases.

19. The circuit of claim 18 wherein said divider circuit divides the zero crossings by the number of zero crossings in one revolution.

* * * * *